United States Patent
Chen et al.

(10) Patent No.: US 10,985,660 B2
(45) Date of Patent: Apr. 20, 2021

(54) DC-DC CONVERTER HAVING HIGHER STABILITY AND OUTPUT ACCURACY

(71) Applicant: MediaTek Singapore Pte. Ltd., Singapore (SG)

(72) Inventors: Tun-Shih Chen, Hsinchu (TW); Soon Hwei Tan, Singapore (SG)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/708,455

(22) Filed: Dec. 10, 2019

(65) Prior Publication Data

US 2020/0186035 A1 Jun. 11, 2020

Related U.S. Application Data

(60) Provisional application No. 62/777,281, filed on Dec. 10, 2018.

(51) Int. Cl.
 *H02M 3/158* (2006.01)
(52) U.S. Cl.
 CPC .................................. *H02M 3/158* (2013.01)
(58) Field of Classification Search
 CPC ................. H02M 3/158; H02M 3/156; H02M 2001/0009; G05F 1/00; G05F 1/10
 See application file for complete search history.

(56) References Cited

U.S. PATENT DOCUMENTS

| 6,163,142 | A | 12/2000 | Tsujimoto |
| 6,469,481 | B1 | 10/2002 | Tateishi |
| 6,879,136 | B1 | 4/2005 | Erisman |
| 7,443,148 | B2 | 10/2008 | Weng |
| 9,059,632 | B2 | 6/2015 | Li et al. |
| 9,317,049 | B2 | 4/2016 | Guo |
| 9,559,583 | B2 | 1/2017 | Lin et al. |
| 10,044,267 | B1 | 8/2018 | Childs |
| 2012/0001608 | A1* | 1/2012 | Sato .................... H02M 3/1588 323/282 |
| 2018/0145589 | A1 | 5/2018 | Labbe |

FOREIGN PATENT DOCUMENTS

| JP | 4834058 B2 | 9/2011 |
| TW | 201417464 A | 5/2014 |
| TW | 201801444 A | 1/2018 |

* cited by examiner

*Primary Examiner* — Adolf D Berhane
*Assistant Examiner* — Afework S Demisse
(74) *Attorney, Agent, or Firm* — Winston Hsu

(57) ABSTRACT

The present invention provides a DC-DC converter, wherein the DC-DC converter includes a controller, a first switch, a second switch, an inductor and a ripple signal generator. The controller is configured to generate an up signal and a down signal according to an output signal and a ripple signal. The first switch is coupled between an input voltage and a first node, and is controlled by the up signal. The second switch is coupled between the first node and a reference voltage, and is controlled by the down signal. The inductor is coupled between the first node and an output node, and is configured to receive a first signal from the first node to generate the output signal at the output node. The ripple signal generator is configured to generate the ripple signal, and reset the ripple signal every cycle to a specific voltage.

12 Claims, 9 Drawing Sheets

DC-DC CONVERTER HAVING HIGHER STABILITY AND OUTPUT ACCURACY

CROSS REFERENCE TO RELATED APPLICATIONS

This application claims the priority of U.S. Provisional Application No. 62/777,281, filed on Dec. 10, 2018, which is included herein by reference in its entirety.

BACKGROUND

A DC-DC converter generally has an inductor and a capacitor for generating an output voltage, and for some DC-DC converters, the stability of the DC-DC converter relies on an equivalent series resistance (ESR) of the capacitor, that is the stability becomes better if the capacitor has a larger ESR (or larger ripple signal generated due to the ESR). However, the DC-DC converter within the consumer product generally uses a ceramic capacitor having smaller ESR, so the DC-DC converter may suffer the stability issue.

To solve the above-mentioned stability issue, the conventional art uses additional signal path to increase the strength of the ripple signal to stabilize the DC-DC converter. However, this additional signal path may worsen the accuracy of the output signal.

SUMMARY

It is therefore an objective of the present invention to provide a DC-DC converter, which has better stability and output accuracy, to solve the above-mentioned problems.

According to one embodiment of the present invention, a DC-DC converter is provided, wherein the DC-DC converter includes a controller, a first switch, a second switch, an inductor and a ripple signal generator. The controller is configured to generate an up signal and a down signal according to an output signal and a ripple signal. The first switch is coupled between an input voltage and a first node, and is controlled by the up signal. The second switch is coupled between the first node and a reference voltage, and is controlled by the down signal. The inductor is coupled between the first node and an output node, and is configured to receive a first signal from the first node to generate the output signal at the output node. The ripple signal generator is configured to generate the ripple signal, and reset the ripple signal every cycle to a specific voltage.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
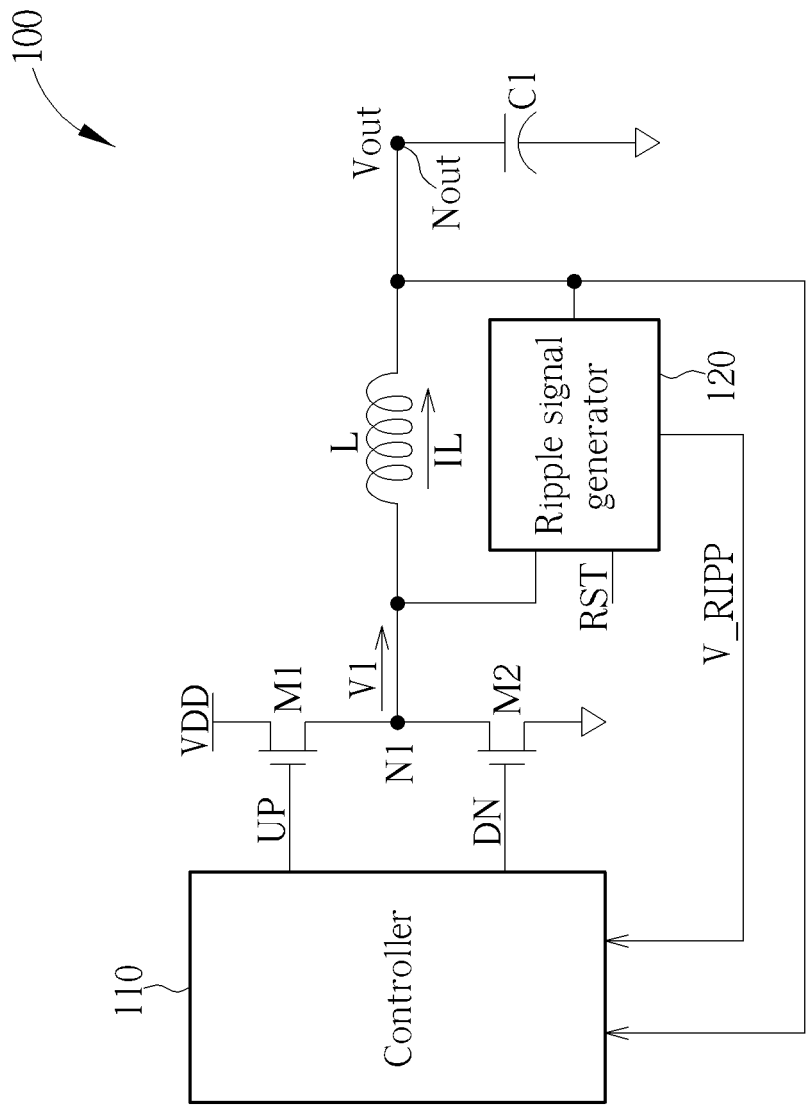
FIG. 1 is a diagram illustrating a DC-DC converter according to a first embodiment of the present invention.

FIG. 1 is a diagram illustrating a DC-DC converter 100 according to a first embodiment of the present invention. As shown in FIG. 1, the DC-DC converter 100 comprises a controller 110, a first switch M1, a second switch M2, an inductor L, a capacitor C and a ripple signal generator 120, where the first switch M1 is coupled between an input voltage VDD and a first node N1, and the second switch M2 is coupled between the first node N1 and a reference voltage.

In the operations of the DC-DC converter 100, the controller 110 generates an up signal UP and a down signal DN according to a feedback signal (i.e. an output signal Vout) and a ripple signal V_RIPP, wherein the up signal UP is used to enable or disable the switch M1 to selectively connect the input voltage VDD to the first node N1, to charge the first node N1 or not; and the down signal DN is used to enable or disable the switch M2 to selectively connect the first node N1 to the reference voltage (e.g. ground voltage), to discharge the first node N1 or not. In this embodiment, each of the up signal UP and the down signal DN is a pulse-width modulation (PWM) signal, and phases and duty cycles of the up signal UP and the down signal DN are designed to make the switches M1 and M2 be not enabled at the same time. Then, a first signal V1 from the first node N1 passes through the inductor L to generate an output signal Vout at an output node Nout of the DC-DC converter 100. In addition, because the capacitor C may have the smaller ESR (e.g. the ceramic capacitor) that influences the stability of the DC-DC converter 100, the ripple signal generator 120 is configured to generate a ripple signal V_RIPP that is in-phase with an inductor current IL of the inductor L to improve the stability. Specifically, the smaller ESR may result in a smaller ripple at the output signal Vout, and the smaller ripple may worsen the operations of the controller 110 and the stability of the DC-DC converter 100, therefore, by further generating the ripple signal V_RIPP to the controller 120, the stability can be effectively improved. Furthermore, because the inductor L has a parasitic resistance that is related to the inductor current IL, the DC voltage at the inductor L may be varied with the inductor current IL. In addition, because the ripple signal generator 120 is connected parallel to the inductor L, the DC voltage of the ripple signal V_RIPP is the same as the DC voltage of the inductor L, causing an error compensation issue. Because the ripple signal V_RIPP may cause the error compensation issue to the output signal Vout, the ripple signal generator 120 further resets the ripple signal V_RIPP every cycle to a specific voltage such as the output voltage Vout, to pull up a level of the ripple signal V_RIPP, to solve this problem.

Figure 2:
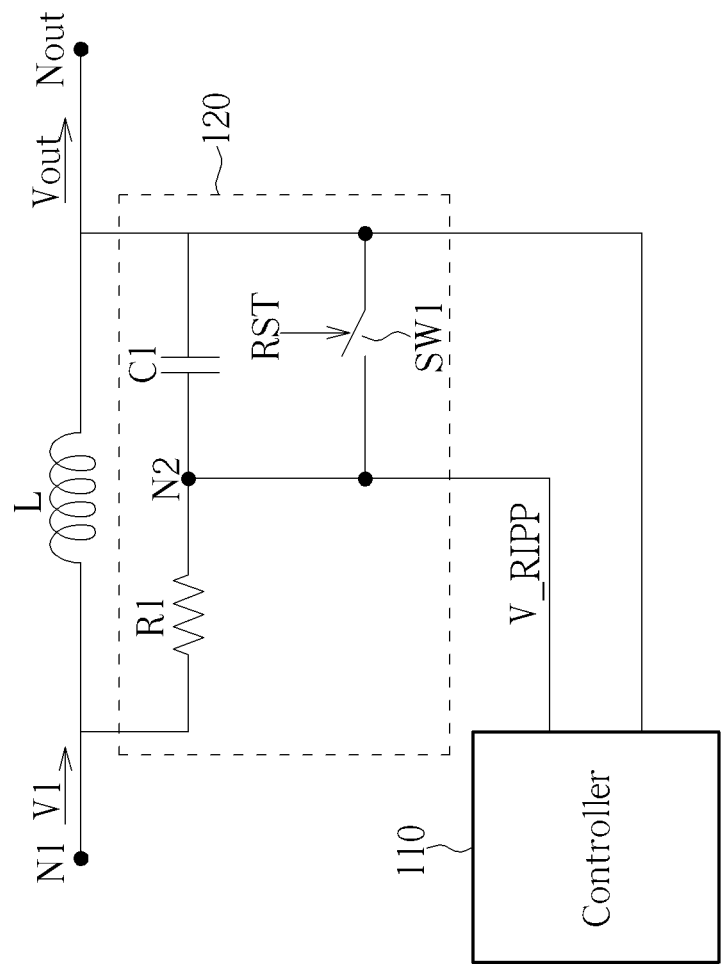
FIG. 2 shows the ripple signal generator shown in FIG. 1 according to one embodiment of the present invention.
Figure 3:
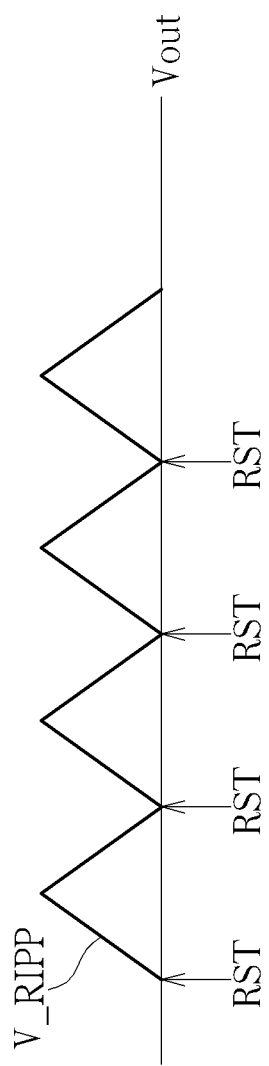
FIG. 3 shows the relationship between the ripple signal and the output signal.

FIG. 2 shows the ripple signal generator 120 according to one embodiment of the present invention. As shown in FIG. 2, the ripple signal generator 120 comprises a resistor R1, a capacitor C2 and a switch SW1, where the resistor R1 is coupled between the first node N1 and a node N2, the capacitor C2 is coupled between the node N2 and the output node Nout, and the switch SW1 is coupled between the node N2 and the output node Nout. In the operations of the ripple signal generator 120, the switch SW1 is controlled by a reset signal RST to connect the node N2 to the output node Nout in every cycle of the ripple signal V_RIPP, to make the ripple signal V_RIPP be connected to the output signal Vout every cycle. Taking FIG. 3 as an example, the ripple signal V_RIPP is like a triangular wave, the reset signal RST may be a pulse, and the switch SW1 is enabled at the lowest point of the ripple signal V_RIPP to make the lowest point of the ripple signal V_RIPP is always substantially equal to the output signal Vout, and the ripple signal V_RIPP is always equal to (substantially equal to) or greater than the output signal Vout.

It is noted that the circuit structure shown in FIG. 2 is for illustrative purposes only, not a limitation of the present invention. As long as the ripple signal generator 120 can generate the ripple signal V_RIPP that is in-phase with the inductor current IL (i.e. the phases of the ripple signal V_RIPP and the inductor current IL are the same or much close to each other), and the ripple signal V_RIPP is reset to a specific voltage (i.e. not necessarily the output signal Vout) every cycle, the ripple signal generator 120 may have other circuit designs.

Figure 4:
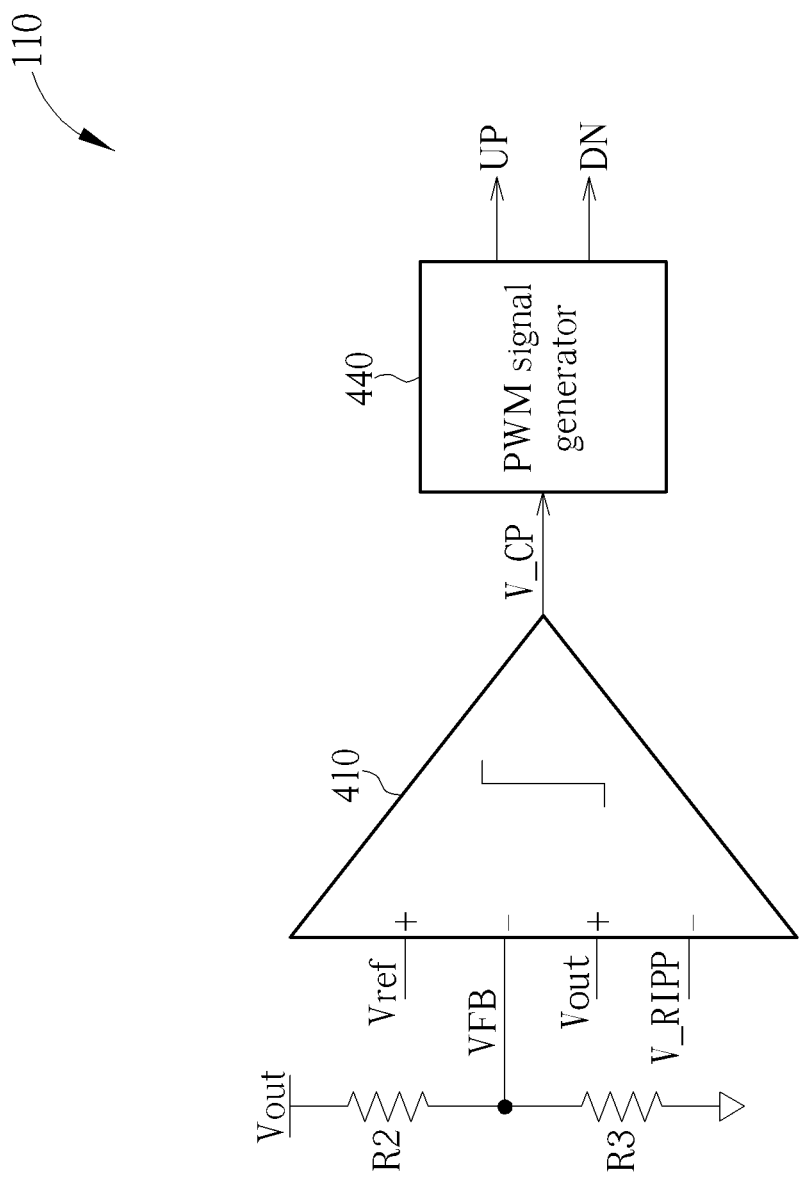
FIG. 4 is a diagram illustrating the controller shown in FIG. 1 according to one embodiment of the present invention.

FIG. 4 is a diagram illustrating the controller 110 according to one embodiment of the present invention. As shown in FIG. 4, the controller 110 comprises a voltage divider comprising resistors R2 and R3, a comparator 410 and a PWM signal generator 440. In the operations of the controller 110, the comparator 410 may comprise a plurality of comparing circuits for determining if (Vref−VFB)+(Vout−V_RIPP) is greater than zero to generate a comparison result V_CP, wherein Vref is a reference voltage, VFB is a feedback signal generated by using the resistors R2 and R3 to divide the output signal Vout. Then, the PWM signal generator 440 refers to the comparison result V_CP to generate the up signal UP and the down signal DN.

In the above embodiment, by generating the ripple signal V_RIPP to the controller 120, and resetting the ripple signal V_RIPP every cycle to the specific voltage such as the output voltage Vout, the stability of the controller 120 can be improved while maintaining the accuracy of the output signal Vout.

Figure 5:
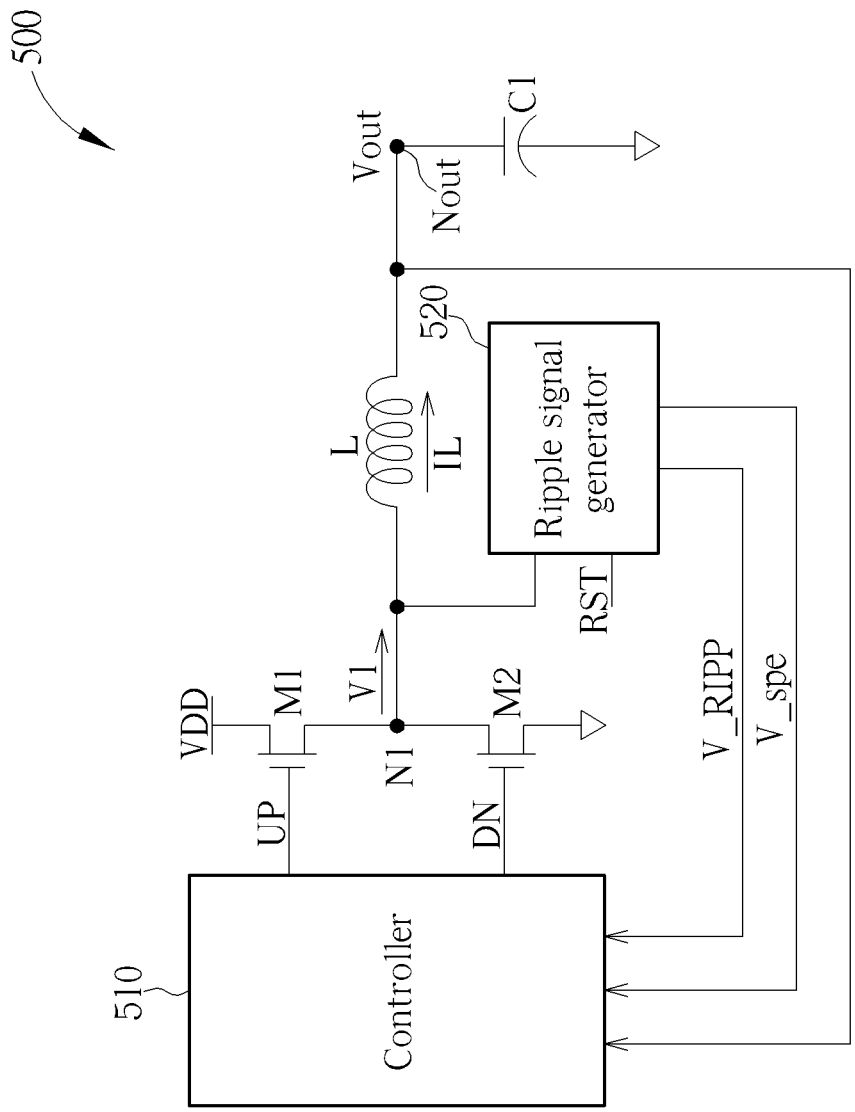
FIG. 5 is a diagram illustrating a DC-DC converter according to a second embodiment of the present invention.

FIG. 5 is a diagram illustrating a DC-DC converter 500 according to a second embodiment of the present invention. As shown in FIG. 5, the DC-DC converter 500 comprises a controller 510, a first switch M1, a second switch M2, an inductor L, a capacitor C and a ripple signal generator 520, where the first switch M1 is coupled between an input voltage VDD and a first node N1, and the second switch M2 is coupled between the first node N1 and a reference voltage.

In the operations of the DC-DC converter 500, the controller 510 generates an up signal UP and a down signal DN according to a feedback signal (i.e. an output signal Vout), a ripple signal V_RIPP and a specific voltage V_spe, wherein the up signal UP is used to enable or disable the switch M1 to selectively connect the input voltage VDD to the first node N1, to charge the first node N1 or not; and the down signal DN is used to enable or disable the switch M2 to selectively connect the first node N1 to the reference voltage (e.g. ground voltage), to discharge the first node N1 or not. In this embodiment, each of the up signal UP and the down signal DN is a PWM signal, and phases and duty cycles of the up signal UP and the down signal DN are designed to make the switches M1 and M2 be not enabled at the same time. Then, a first signal V1 from the first node N1 passes through the inductor L to generate an output signal Vout at an output node Nout of the DC-DC converter 500. In addition, because the capacitor C may have the smaller ESR that influences the stability of the DC-DC converter 500, the ripple signal generator 520 is configured to generate a ripple signal V_RIPP that is in-phase with an inductor current IL of the inductor L to improve the stability. Specifically, the smaller ESR may result in a smaller ripple at the output signal Vout, and the smaller ripple may worsen the operations of the controller 510 and the stability of the DC-DC converter 500, therefore, by further generating the ripple signal V_RIPP to the controller 520, the stability can be effectively improved. Furthermore, because the ripple signal V_RIPP may cause an error compensation issue to the output signal Vout, the ripple signal generator 520 further resets the ripple signal V_RIPP every cycle to the specific voltage V_spe, to pull up a level of the ripple signal V_RIPP, to solve this problem.

Figure 6:
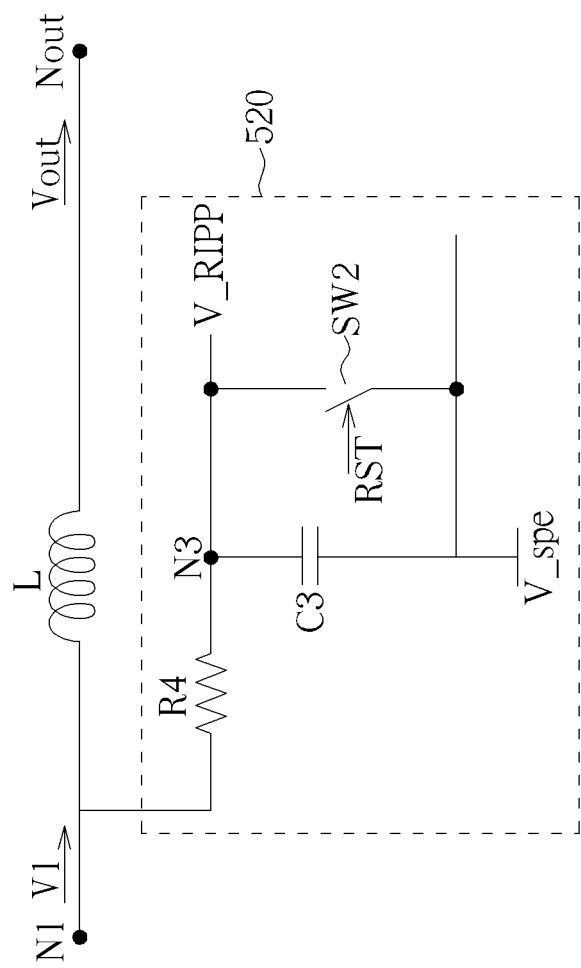
FIG. 6 shows the ripple signal generator shown in FIG. 5 according to one embodiment of the present invention.

FIG. 6 shows the ripple signal generator 520 according to one embodiment of the present invention. As shown in FIG. 5, the ripple signal generator 520 comprises a resistor R4, a capacitor C3 and a switch SW2, where the resistor R4 is coupled to the capacitor C4 via a node N4, the capacitor C4 is coupled between the node N4 and the specific voltage V_spe, and the switch SW3 is coupled between the node N4 and the specific voltage V_spe. In the operations of the ripple signal generator 520, the switch SW2 is controlled by a reset signal RST to connect the node N3 to the specific voltage V_spe in every cycle of the ripple signal V_RIPP, to make the ripple signal V_RIPP be connected to the specific voltage V_spe every cycle. Similar to the embodiment shown in FIG. 3, the ripple signal V_RIPP is like a triangular wave, the reset signal RST may be a pulse, and the switch SW2 is enabled at the lowest point of the ripple signal V_RIPP to make the lowest point of the ripple signal V_RIPP is always substantially equal to the specific voltage V_spe, and the ripple signal V_RIPP is always equal to (substantially equal to) or greater than the specific voltage V_spe.

In one embodiment, the specific voltage V_spe may be generated by using the output signal Vout or the first signal V1, for example, the specific voltage V_spe may be generated by low-pass filtering the first signal V1.

It is noted that the circuit structure shown in FIG. 5 is for illustrative purposes only, not a limitation of the present invention. As long as the ripple signal generator 520 can generate the ripple signal V_RIPP that is in-phase with the inductor current IL (i.e. the phases of the ripple signal V_RIPP and the inductor current IL are the same or much close to each other), and the ripple signal V_RIPP is reset to the specific voltage every cycle, the ripple signal generator 520 may have other circuit designs.

The controller 510 may be designed to have the circuitry similar to FIG. 4, just modify the comparator 420 to receive the ripple signal V_RIPP and the specific voltage V_spe.

Figure 7:
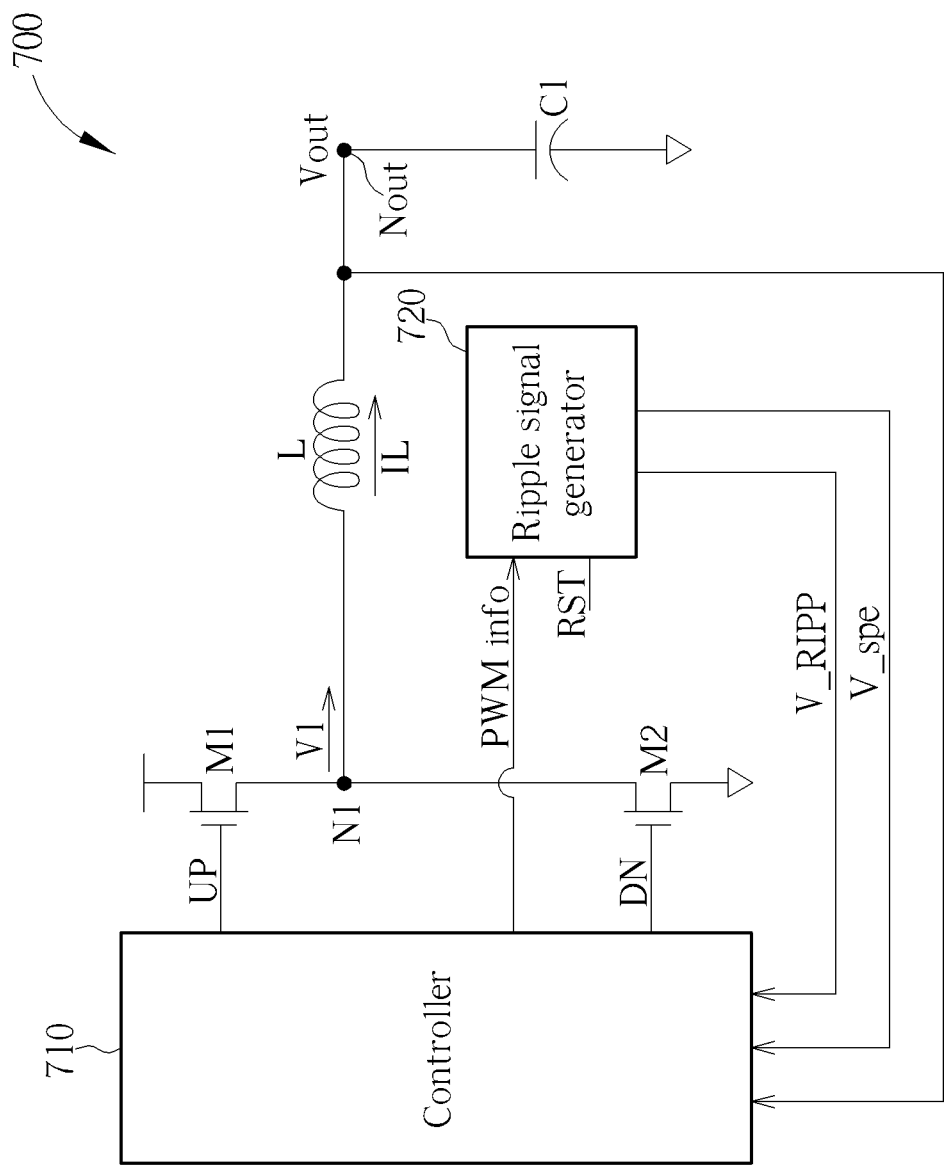
FIG. 7 is a diagram illustrating a DC-DC converter according to a third embodiment of the present invention.

FIG. 7 is a diagram illustrating a DC-DC converter 700 according to a third embodiment of the present invention. As shown in FIG. 7, the DC-DC converter 700 comprises a controller 710, a first switch M1, a second switch M2, an inductor L, a capacitor C and a ripple signal generator 720, where the first switch M1 is coupled between an input voltage VDD and a first node N1, and the second switch M2 is coupled between the first node N1 and a reference voltage.

In the operations of the DC-DC converter 700, the controller 710 generates an up signal UP and a down signal DN according to a feedback signal (i.e. an output signal Vout), a ripple signal V_RIPP and a specific voltage V_spe, wherein the up signal UP is used to enable or disable the switch M1 to selectively connect the input voltage VDD to the first node N1, to charge the first node N1 or not; and the down signal DN is used to enable or disable the switch M2 to selectively connect the first node N1 to the reference voltage (e.g. ground voltage), to discharge the first node N1 or not. In this embodiment, each of the up signal UP and the down signal DN is a PWM signal, and phases and duty cycles of the up signal UP and the down signal DN are designed to make the switches M1 and M2 be not enabled at the same time. Then, a first signal V1 from the first node N1 passes through the inductor L to generate an output signal Vout at an output node Nout of the DC-DC converter 700. In addition, because the capacitor C may have the smaller ESR that influences the stability of the DC-DC converter 700, the ripple signal generator 720 is configured to generate a ripple signal V_RIPP that is in-phase with an inductor current IL of the inductor L to improve the stability. Specifically, the smaller ESR may result in a smaller ripple at the output signal Vout, and the smaller ripple may worsen the operations of the controller 710 and the stability of the DC-DC converter 700, therefore, by further generating the ripple signal V_RIPP to the controller 720, the stability can be effectively improved. Furthermore, because the ripple signal V_RIPP may cause an error compensation issue to the output signal Vout, the ripple signal generator 520 further resets the ripple signal V_RIPP every cycle to the specific voltage V_spe, to pull up a level of the ripple signal V_RIPP, to solve this problem.

Figure 8:
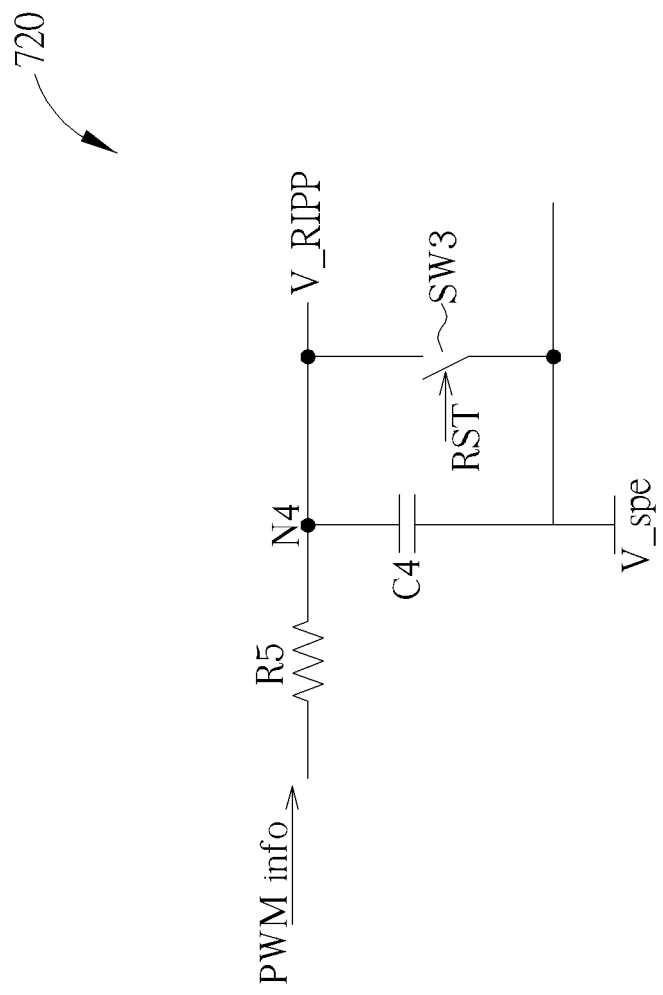
FIG. 8 shows the ripple signal generator shown in FIG. 7 according to one embodiment of the present invention.

FIG. 8 shows the ripple signal generator 720 according to one embodiment of the present invention. As shown in FIG. 8, the ripple signal generator 820 comprises a resistor R5, a capacitor C4 and a switch SW3, where the resistor R5 is coupled between the first node N1 and a node N3, the capacitor C3 is coupled between the node N3 and the output node Nout, and the switch SW2 is coupled between the node N and the specific voltage V_spe. In the operations of the ripple signal generator 720, the controller 710 generates PWM information to the resistor R5 to generate the ripple signal V_RIPP, wherein the PWM information may be the up signal UP, the down signal DN or any other signal capable of representing the first signal V1 or the inductor current IL. The switch SW3 is controlled by a reset signal RST to connect the node N4 to the specific voltage V_spe in every cycle of the ripple signal V_RIPP, to make the ripple signal V_RIPP be connected to the specific voltage V_spe every cycle. Similar to the embodiment shown in FIG. 3, the ripple signal V_RIPP is like a triangular wave, the reset signal RST may be a pulse, and the switch SW3 is enabled at the lowest point of the ripple signal V_RIPP to make the lowest point of the ripple signal V_RIPP is always substantially equal to the specific voltage V_spe, and the ripple signal V_RIPP is always equal to (substantially equal to) greater than the specific voltage V_spe.

In one embodiment, the specific voltage V_spe may be generated by using the output signal Vout or the first signal V1, for example, the specific voltage V_spe may be generated by low-pass filtering the first signal V1.

It is noted that the circuit structure shown in FIG. 8 is for illustrative purposes only, not a limitation of the present invention. As long as the ripple signal generator 720 can generate the ripple signal V_RIPP that is in-phase with the inductor current IL (i.e. the phases of the ripple signal V_RIPP and the inductor current IL are the same or much close to each other), and the ripple signal V_RIPP is reset to the specific voltage every cycle, the ripple signal generator 720 may have other circuit designs.

The controller 710 may be designed to have the circuitry similar to FIG. 4, just modify the comparator 420 to receive the ripple signal V_RIPP and the specific voltage V_spe.

Figure 9:
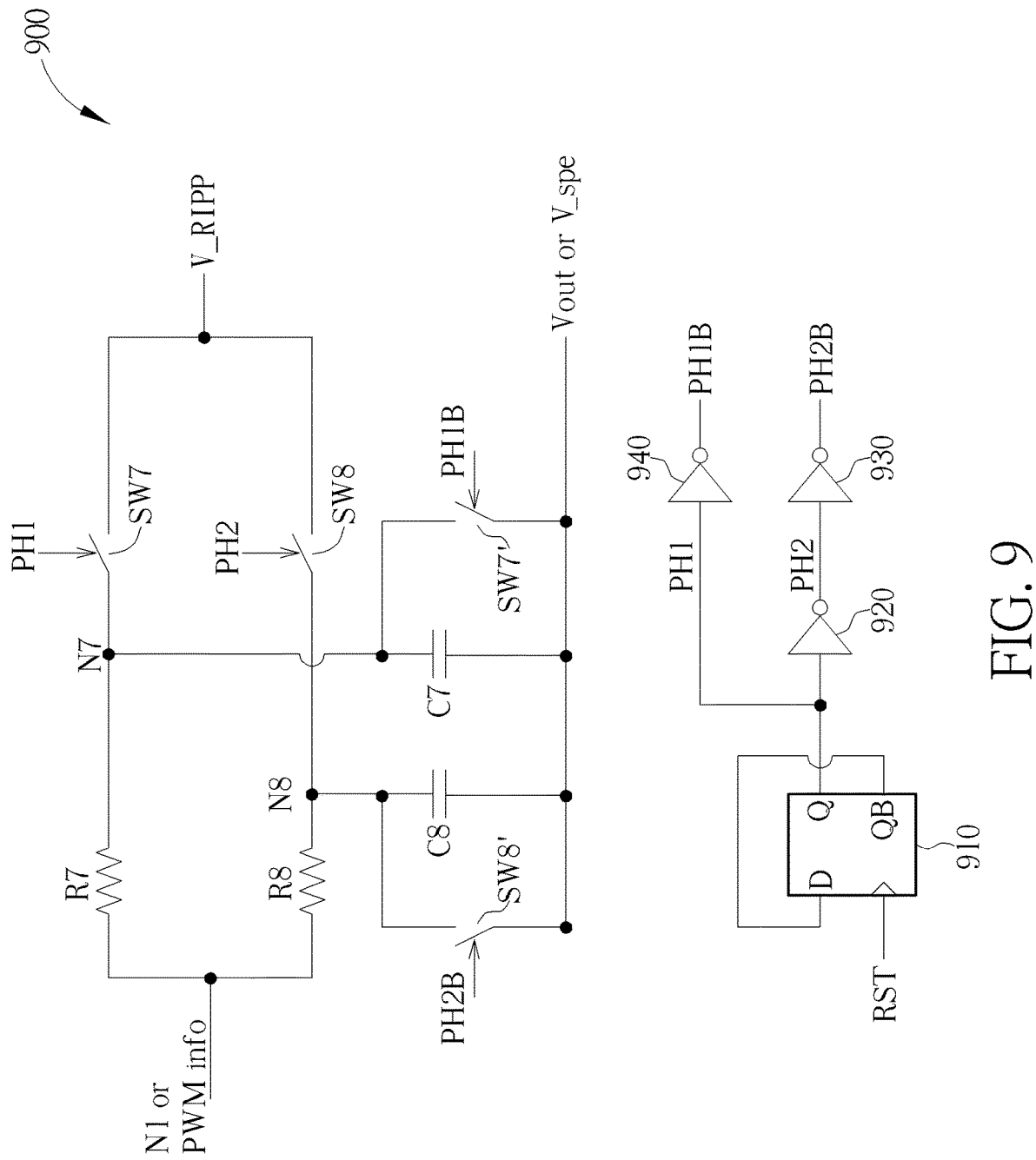
FIG. 9 shows a ripple signal generator according to one embodiment of the present invention.

In the above embodiments, the reset signal RST is a pulse signal, and the pulse width should be long enough to make the lowest point of the ripple signal V_RIPP is always substantially equal to the output signal Vout or the specific voltage V_spe. However, the longer pulse width of the reset signal RST may influence the accuracy of the output signal Vout. In order to maintain the accuracy of the output signal Vout, the ripple signal generator may be designed to have two paths for generating the ripple signal V_RIPP in an interleaving manner. FIG. 9 shows a ripple signal generator 900 according to one embodiment of the present invention, wherein the ripple signal generator 900 can be used to implement any one of the ripple signal generator 120, 520 and 720. As shown in FIG. 9, the ripple signal generator 900 comprises two RC groups and a control signal generator, wherein the first RC group comprises a resistor R7, a capacitor C7 and two switches SW7 and SW7', the second RC group comprises a resistor R8, a capacitor C8 and two switches SW8 and SW8', and the control signal generator comprises a D-type flip-flop 910 and three inverters 920, 930 and 940 for generating control signals PH1, PH1B, PH2, PH2B to control the switches SW7, SW7', SW8 and SW8', respectively. In the operations of the ripple signal generator 900, the first RC group and the second RC group are used to be reset and to generate the ripple signal V_RIPP in the interleaving manner, that is the first RC group is configured to generate the ripple signal V_RIPP while the second RC group is reset, and the second RC group is configured to generate the ripple signal V_RIPP while the first RC group is reset. In detail, in the first phase, the first RC group is reset and the second RC group generates the ripple signal V_RIPP, that is the switch SW7 is turned off and the switch SW7' is turned on to connect the node N7 to the output signal Vout or the specific voltage V_spe, and the switch SW8 is turned on to generate the ripple signal V_RIPP, and the switch SW8' is turned off. In the second phase following the first phase, the second RC group is reset and the first RC group generates the ripple signal V_RIPP, that is the switch SW8 is turned off and the switch SW8' is turned on to connect the node N8 to the output signal Vout or the specific voltage V_spe, and the switch SW7 is turned on to generate the ripple signal V_RIPP, and the switch SW7' is turned off. Then, the first phase and the second phase are repeatedly executed to generate the ripple signal V_RIPP by using different RC groups. In light of above, because the ripple signal V_RIPP is generated by the RC group that has been reset before, the DC-DC converter using ripple signal generator 900 can generate the output signal Vout more accurately.

Briefly summarized, in the DC-DC converter of the present invention, the ripple signal is generated to compensate the smaller ripple on the output signal of the DC-DC converter, and the ripple signal is further reset to the specific voltage every cycle to maintain the accuracy of the output signal. Therefore, the DC-DC converter of the present invention has better stability of output accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A DC-DC converter, comprising:
   a controller, configured to generate an up signal and a down signal according to an output signal and a ripple signal;
   a first switch, coupled between an input voltage and a first node, and controlled by the up signal;
   a second switch, coupled between the first node and a reference voltage, and controlled by the down signal;
   an inductor, coupled between the first node and an output node, configured to receive a first signal from the first node to generate the output signal at the output node; and
   a ripple signal generator, configured to generate the ripple signal, and reset the ripple signal every cycle to a specific voltage;
   wherein the ripple signal generator resets the ripple signal every cycle to the output signal to make that a lowest point of the ripple signal is substantially equal to the output signal.

2. The DC-DC converter of claim 1, wherein the ripple signal is in-phase with an inductor current flowing through the inductor.

3. The DC-DC converter of claim 1, wherein the ripple signal generator comprises:
   a resistor, wherein one node of the resistor is coupled to the first node;
   a capacitor, wherein one node of the capacitor is coupled to the other node of the resistor, and the other node of the capacitor is coupled to the output node;
   wherein the ripple signal is generated from the other node of the resistor, and the ripple signal generator connects the ripple signal to the output signal every cycle.

4. The DC-DC converter of claim 3, wherein the ripple signal generator further comprises:
   a switch, coupled between the one node of the capacitor and the output node;
   wherein the switch is controlled by a reset signal to connect the one node of the capacitor to the output node in every cycle of the ripple signal, to make the ripple signal be connected to the output signal every cycle.

5. The DC-DC converter of claim 1, wherein the ripple signal generator refers the up signal, the down signal or the first signal to generate the ripple signal.

6. A DC-DC converter, comprising:
   a controller, configured to generate an up signal and a down signal according to an output signal and a ripple signal;
   a first switch, coupled between an input voltage and a first node, and controlled by the up signal;
   a second switch, coupled between the first node and a reference voltage, and controlled by the down signal;
   an inductor, coupled between the first node and an output node, configured to receive a first signal from the first node to generate the output signal at the output node; and
   a ripple signal generator, configured to generate the ripple signal, and reset the ripple signal every cycle to a specific voltage;
   wherein the controller generates the up signal and the down signal according to the output signal, the ripple signal and the specific voltage, and the ripple signal generator resets the ripple signal every cycle to the specific voltage to make that a lowest point of the ripple signal is substantially equal to the specific voltage.

7. The DC-DC converter of claim 6, wherein the ripple signal generator receives the first signal to generate the ripple signal.

8. The DC-DC converter of claim 7, wherein the ripple signal generator comprises:
   a resistor, wherein one node of the resistor is coupled to the first node;
   a capacitor, wherein one node of the capacitor is coupled to the other node of the resistor, and the other node of the capacitor is coupled to the specific voltage;
   wherein the ripple signal is generated from the other node of the resistor, and the ripple signal generator connects the ripple signal to the specific voltage every cycle.

9. The DC-DC converter of claim 8, wherein the ripple signal generator further comprises:
   a switch, coupled between the one node of the capacitor and the specific voltage;
   wherein the switch is controlled by a reset signal to connect the one node to the capacitor and the specific voltage in every cycle of the ripple signal, to make the ripple signal be connected to the specific voltage every cycle.

10. The DC-DC converter of claim 6, wherein the specific voltage is generated according to the output signal or the first signal.

11. A DC-DC converter, comprising:
    a controller, configured to generate an up signal and a down signal according to an output signal and a ripple signal;
    a first switch, coupled between an input voltage and a first node, and controlled by the up signal;
    a second switch, coupled between the first node and a reference voltage, and controlled by the down signal;
    an inductor, coupled between the first node and an output node, configured to receive a first signal from the first node to generate the output signal at the output node; and
    a ripple signal generator, configured to generate the ripple signal, and reset the ripple signal every cycle to a specific voltage;
    wherein the ripple signal generator has two circuit group, and the two circuit group are configured to generate the ripple signal and reset the ripple signal to the specific voltage in an interleaving manner.

12. The DC-DC converter of claim 11, wherein the ripple signal generator comprises a first circuit group and a second circuit group, the first circuit group resets a first ripple signal while the second circuit group generates a second ripple signal serving as the ripple signal outputted to the controller, and the second circuit group resets the second ripple signal while the first circuit group generates the first ripple signal serving as the ripple signal outputted to the controller.

* * * * *